US008295619B2

(12) United States Patent
Lin et al.

(10) Patent No.: US 8,295,619 B2
(45) Date of Patent: Oct. 23, 2012

(54) IMAGE PROCESSING APPARATUS EMPLOYED IN OVERDRIVE APPLICATION FOR COMPRESSING IMAGE DATA OF SECOND FRAME ACCORDING TO FIRST FRAME PRECEDING SECOND FRAME AND RELATED IMAGE PROCESSING METHOD THEREOF

(75) Inventors: Wei-Hsien Lin, Hsinchu (TW); Chiuan-Shian Chen, Tainan (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 382 days.

(21) Appl. No.: 12/754,584

(22) Filed: Apr. 5, 2010

(65) Prior Publication Data

US 2011/0243465 A1 Oct. 6, 2011

(51) Int. Cl.
*G06K 9/36* (2006.01)

(52) U.S. Cl. ......... 382/232; 382/233; 382/236; 382/250

(58) Field of Classification Search .................. 382/232, 382/233, 250, 236; 455/245.1, 13.4; 370/318; 386/314; 375/E7.148, E7.134, 240.18; 348/568, 348/584

See application file for complete search history.

(56) References Cited

U.S. PATENT DOCUMENTS 5,929,930 A * 7/1999 Kurokawa .................... 348/568

* cited by examiner

*Primary Examiner* — Anh Hong Do

(74) *Attorney, Agent, or Firm* — Winston Hsu; Scott Margo

(57) ABSTRACT

An image processing apparatus includes a storage device, an image detection circuit, a compression circuit, a decompression circuit, and an overdrive processing circuit. The image detection circuit generates a compression mode control signal according to a first frame. The compression circuit compresses an image data of a second frame according to the compression mode control signal, thereby generating a compressed image data of the second frame to the storage device. The first frame precedes the second frame. The decompression circuit decompresses the compressed image data of the second frame read from the storage device according to the compression mode control signal, thereby generating a recovered image data of the second frame. The overdrive processing circuit determines overdrive voltages of a third frame according to an image data of the third frame and the recovered image data of the second frame, where the second frame precedes the third frame.

23 Claims, 7 Drawing Sheets

IMAGE PROCESSING APPARATUS EMPLOYED IN OVERDRIVE APPLICATION FOR COMPRESSING IMAGE DATA OF SECOND FRAME ACCORDING TO FIRST FRAME PRECEDING SECOND FRAME AND RELATED IMAGE PROCESSING METHOD THEREOF

BACKGROUND

The disclosed embodiments of the present invention relate to processing an image data, and more particularly, to an image data compression apparatus employed in an overdrive application and capable of compressing an image data of a second frame according to a first frame preceding the second frame and related image processing method thereof.

Data compression is commonly used to reduce the amount of data stored in a storage device. Regarding an overdrive technique applied to a liquid crystal display (LCD) panel for example, it artificially boosts the response time by increasing the driving voltage used to make a liquid crystal cell change its state. The overdrive voltage of one liquid crystal cell (i.e., one pixel) is determined by a pixel value in a current frame and a pixel value in a previous frame. Therefore, an image data of the previous frame has to be recorded into a frame buffer for later use. In general, the image data of the previous frame will be compressed before stored into the frame buffer, and the compressed data of the previous frame will be read from the frame buffer and decompressed to produce a recovered image data of the previous frame.

If a compression approach which provides a lower compression ratio is employed to compress the image data of the previous frame, the frame buffer is required to have a greater storage capacity and higher bandwidth. However, if a compression approach which provides a higher compression ratio is employed to compress the image data of the previous frame, a difference (error) between an original image data and a recovered image data derived from the compressed image data will become more significant, leading to degradation of the final display quality. In addition, the storage capacity of the frame buffer is generally determined according to a desired compression ratio. Thus, the bandwidth of the frame buffer has an upper bound due to the desired compression ratio. However, there is no lower bound for the bandwidth. Therefore, it is possible that a compression approach which provides a higher compression ratio is employed to compress a frame with simple image contents. As a result, only part of the bandwidth is used and the image output quality of the frame with simple image contents is degraded because of the higher compression ratio. Therefore, the conventional design may not properly use the available bandwidth for achieving optimized image output quality.

In view of above, there is a need for an image data processing apparatus and method which can meet a compression ratio criterion of the frame buffer without sacrificing the image output quality.

SUMMARY

In accordance with exemplary embodiments of the present invention, an image data compression apparatus employed in an overdrive application and capable of compressing an image data of a second frame according to a first frame preceding then second frame and related image processing method thereof are proposed to solve the above-mentioned problem.

According to a first aspect of the present invention, an exemplary image processing apparatus is disclosed. The exemplary image processing apparatus includes a storage device, an image detection circuit, a compression circuit, a decompression circuit, and an overdrive processing circuit. The image detection circuit generates a compression mode control signal according to a first frame. The compression circuit compresses an image data of a second frame according to the compression mode control signal, thereby generating a compressed image data of the second frame to the storage device. The first frame precedes the second frame. The decompression circuit decompresses the compressed image data of the second frame read from the storage device according to the compression mode control signal, thereby generating a recovered image data of the second frame. The overdrive processing circuit determines overdrive voltages of a third frame according to an image data of the third frame and the recovered image data of the second frame, where the second frame precedes the third frame.

According to a second aspect of the present invention, an exemplary image processing method is disclosed. The exemplary image processing method includes the following steps: generating and outputting a compression mode control signal according to a first frame; generating a compressed image data of a second frame by performing a compression operation upon an image data of the second frame according to the compression mode control signal, and buffering the compressed image data of the second frame, wherein the first frame precedes the second frame; reading the buffered compressed image data of the second frame, and decompressing the buffered compressed image data of the second frame according to the compression mode control signal and accordingly generating a recovered image data of the second frame; and determining overdrive voltages of a third frame according to an image data of the third frame and the recovered image data of the second frame, wherein the second frame precedes the third frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
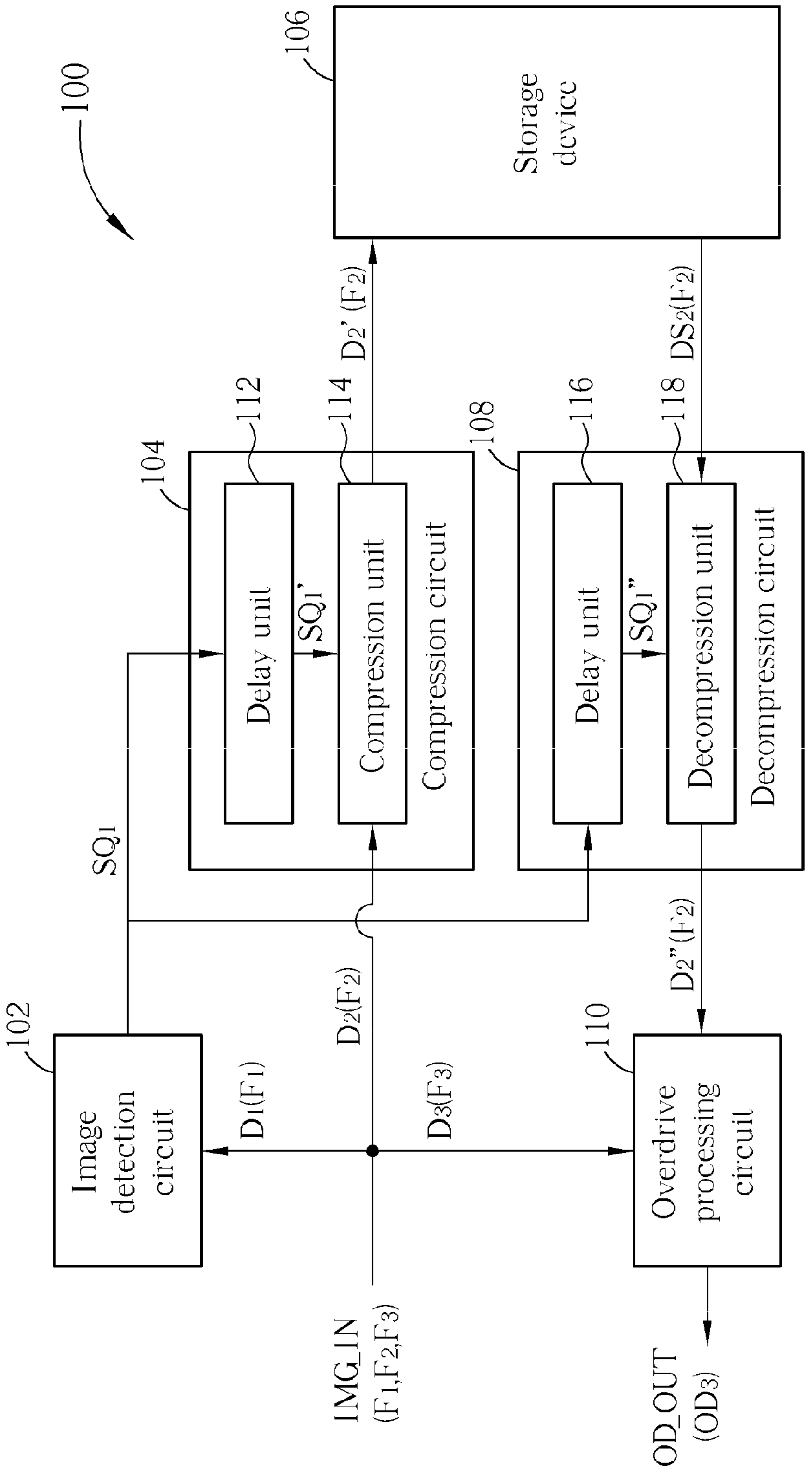
FIG. 1 is a block diagram illustrating a first exemplary embodiment of an image processing apparatus according to the present invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to derive a compression mode control signal according to a first frame (e.g., a previous frame) and refers to the compression mode control signal to compress an image data of a second frame (e.g., a current frame) following the first frame. In general, image contents of two successive frames would not have a significant change. Based on such an observation, information derived from a previous frame can act as a reference used for determining how to compress an image data of a current frame. In this way, when a compression ratio of the previous frame (i.e., a ratio of a data size of an original image data of the previous frame to a data size of a compressed image data of the previous frame) is too high, implying that the image output quality is poorer, a compression ratio of the current frame (i.e., a ratio of a data size of an original image data of the current frame to a data size of a compressed image data of the current frame) can be decreased to improve the image output quality. It should be noted that the buffer size of the frame buffer is fixed according to a desired compression ratio. Therefore, the data size of the compressed image data of one frame should not exceed the buffer size. For example, in a case where the frame buffer is allowed to store one-third of the original image data of one frame, the criterion of the compression ratio CR is defined as $CR \leqq 3$. Provided that the compression ratio criterion is not violated, the compression operation will employ a proper compression mode setting according to information derived from the image data of the previous frame or derived from compressing the image data of the previous frame, and then compress the image data of the current frame by the selected compression mode setting to get optimized image output quality. Briefly summarized, regarding a current frame having simple image contents, a compression mode setting employed by the compression operation is switched to a high quality setting to obtain best image output quality based on information derived from a previous frame; in addition, regarding a current frame having complex image contents, the compression mode setting employed by the compression operation is switched to a normal quality setting to prevent the compression ratio criterion from being violated. To put it in another way, the available bandwidth of the frame buffer is efficiently used to make the image output quality of each frame optimized. Further details will be described as follows.

FIG. 1 is a block diagram illustrating a first exemplary embodiment of an image processing apparatus according to the present invention. The image processing apparatus 100 is utilized to process a plurality of successively transmitted frames IMG_IN, and includes, but is not limited to, an image detection circuit 102, a compression circuit 104, a storage device 106, a decompression circuit 108, and an overdrive processing circuit 110, where the compression circuit 104 includes a delay unit 112 and a compression unit 114, and the decompression circuit 108 includes a delay unit 116 and a decompression unit 118. The image detection circuit 102 generates and outputs a compression mode control signal according to each frame. For example, the image detection circuit 102 generates a compression mode control signal $SQ_1$ according to a first frame $F_1$ (e.g., a previous frame). The compression circuit 104 is coupled to the storage device 106 and the image detection circuit 102, and utilized for compressing an image data of an incoming frame to generate a compressed image data of the incoming frame according to a compression mode control signal derived from a previous frame. For example, the compression circuit 104 compresses an image data $D_2$ of a second frame (e.g., a current frame) $F_2$ according to the compression mode control signal $SQ_1$ and accordingly generates a compressed image data $D_2'$ of the second frame $F_2$ to the storage device (e.g., a frame buffer) 106, where the first frame $F_1$ precedes the second frame $F_2$ (i.e., the first frame $F_1$ and the second frame $F_2$ are temporally adjacent frames that are successively transmitted). It should be noted that the storage device 106 in this exemplary embodiment is used to buffer the compressed image data of one frame for later use.

As the timing of the image detection circuit 102 generating the compression mode control signal $SQ_1$ according to the first frame $F_1$ is prior to the timing of the compression circuit 104 compressing the second frame $F_2$, the delay unit 112 is implemented to apply a proper delay amount to the compression mode control signal $SQ_1$. Thus, the compression unit 114 compresses the image data $D_2$ of the second frame $F_2$ according to the delayed compression mode control signal $SQ_1'$ generated from the delay unit 112. However, this is for illustrative purposes only. As long as the compression circuit 104 can successfully generate a compressed image data of an incoming frame according to a compression mode control signal generated from a previous frame, the compression circuit 104 may be modified to have additional elements included therein or have elements totally different from that shown in FIG. 1. These alternative designs all obey the spirit of the present invention.

The decompression circuit 108 is coupled to the storage device 106, and utilized for reading a compressed image data of a specific frame from the storage device 106. Next, the decompression circuit 108 refers to a compression mode control signal utilized for compressing the specific frame to decompress the compressed image data of the specific frame, and accordingly generates a recovered image data of the specific frame. For example, the decompression circuit 108 reads the compressed image data $DS_2$ of the second frame $F_2$ from the storage device 106, and decompresses the compressed image data $DS_2$ of the second frame $F_2$ according to the compression mode control signal $SQ_1$, thereby generating a recovered image data $D_2''$ of the second frame $F_2$. Please note that the content of the compressed image data $DS_2$ read from the storage device 106 is identical to the content of the compressed image data $D_2'$ stored into the storage device 106, but there is one frame delay time between the timing of reading the compressed image data $DS_2$ from the storage device 106 and the timing of storing the compressed image data $D_2'$ into the storage device 106.

As the timing of the image detection circuit 102 generating the compression mode control signal $SQ_1$ according to the first frame $F_1$ is prior to the timing of the decompression circuit 108 decompressing the compressed image data $DS_2$ of the second frame $F_2$, the delay unit 116 is therefore implemented to apply a proper delay amount to the compression mode control signal $SQ_1$. Thus, the decompression unit 118 decompresses the compressed image data $DS_2$ of the second frame $F_2$ according to the delayed compression mode control signal $SQ_1''$ generated from the delay unit 116. However, this is for illustrative purposes only. As long as the decompression circuit 108 can successfully generate a recovered image data of a specific frame according to a compression mode control signal generated from a previous frame, the decompression circuit 108 may be modified to have additional elements included therein or have elements totally different from that shown in FIG. 1. These alternative designs all obey the spirit of the present invention.

The overdrive processing circuit 110 is coupled to the decompression circuit 108 and utilized for determining overdrive voltages OD_OUT of pixels according to two successive frames. For example, the overdrive processing circuit 110 determines overdrive voltages $OD_3$ of a third frame $F_3$ (e.g., a next frame of the second frame F2) according to an image data of the third frame $F_3$ and the recovered image data $D_2$" of the second frame $F_2$. In one exemplary implementation, the overdrive processing circuit 110 may be simply realized by an overdrive look-up table (LUT).

Figure 2:
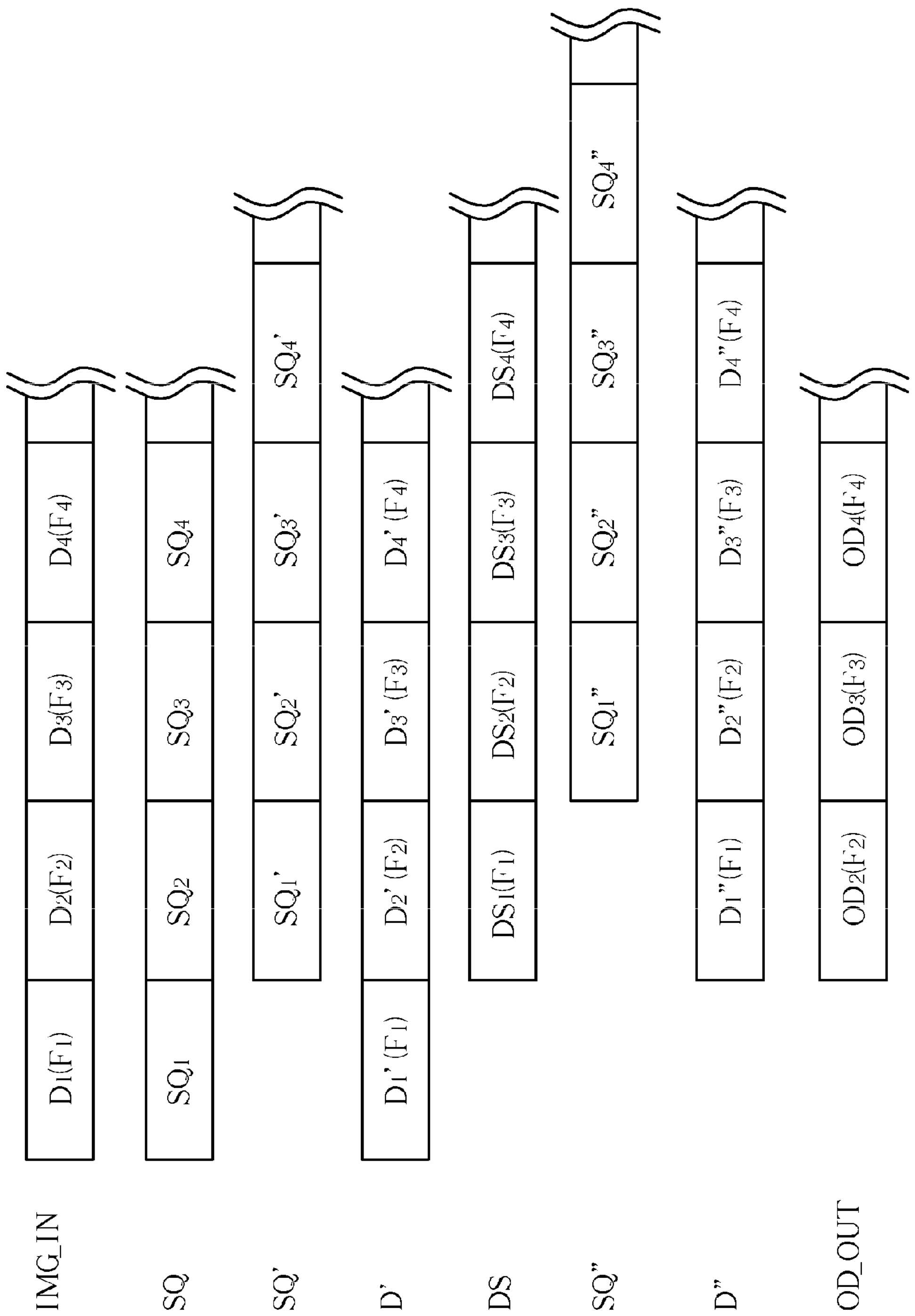
FIG. 2 is a timing diagram illustrating the operation of the exemplary image processing apparatus shown in FIG. 1.

The aforementioned image data processing with certain frames $F_1$-$F_3$ involved therein is for illustrative purposes. In other words, the block diagram shown in FIG. 1 simply provides an operational overview of the image processing apparatus 100 in terms of three successive transmitted frames. To have better understanding of technical features of the exemplary image processing apparatus 100, please refer to FIG. 2, which is a timing diagram illustrating the operation of the exemplary image processing apparatus 100 shown in FIG. 1. As shown in the example of FIG. 2, successive frames IMG_IN are received by the image processing apparatus 100, and the output SQ of the image detection circuit 102 includes compression mode control signals $SQ_1$-$SQ_4$ generated according to image data $D_1$-$D_4$ of frames $F_1$-$F_4$, respectively. In addition, the output D' of the compression circuit 104 includes compressed image data $D_1$'-$D_4$' of frames $F_1$-$F_4$, respectively; in addition, the compressed image data $D_2$'-$D_4$' are generated under the control of the output SQ' of the delay unit 104 (e.g., delayed compression mode control signals $SQ_1$'-$SQ_3$'). Similarly, the output D" of the decompression circuit 108 includes recovered image data $D_1$"-$D_4$" of frames $F_1$-$F_4$, respectively, and the recovered image data $D_2$"-$D_4$" are generated according to an output DS (e.g., compressed image data $DS_1$-$DS_4$ of frames $F_1$-$F_4$ respectively read from the storage device 106) under the control of the output SQ" of the delay unit 116 (e.g., delayed compression mode control signals $SQ_1$"-$SQ_3$"). The overdrive processing circuit 110 therefore generates the overdrive voltages OD_OUT, including $OD_2$-$OD_4$ for pixels within respective frames $F_2$-$F_4$, according to recovered image data $D_1$"-$D_3$" and image data $D_2$-$D_4$ of the frames $F_2$-$F_4$.

In this exemplary embodiment shown in FIG. 1, the image detection circuit 102 generates the compression mode control signal $SQ_1$ according to the first frame $F_1$. More specifically, the image detection circuit 102 analyzes an image data $D_1$ of the first frame $F_1$ to generate the compression mode control signal $SQ_1$. By way of example, but not limitation, the image detection circuit 102 determines the compression mode control signal $SQ_1$ according to spatial redundancy of the first frame $F_1$. In other words, the image detection circuit 102 sets the compression mode control signal $SQ_1$ by referring to image complexity of the first frame $F_1$. In general, the compression ratio corresponding to a simple image is higher than the compression ratio corresponding to a complex image. Regarding a conventional design, a compression approach which provides a compression ratio higher than a desired compression ratio determined by the actual size of the storage device (e.g., the frame buffer) is employed to compress the simple image. Thus, the data amount of the corresponding compression result may merely occupy part of the bandwidth of the storage device. As known to those skilled in the art, higher compression ratio means more information loss. Therefore, to fully use the bandwidth of the storage device (e.g., the frame buffer) for better image output quality, the image detection circuit 102 generates the compression mode control signal to control how the compression circuit 104 performs the compression operation.

Taking the compression of the image data $D_2$ of the second frame $F_2$ for example, the compression mode control signal $SQ_1$ will instruct the compression circuit 104 to refer to a compression mode selected from a plurality of different candidate compression modes under a compression approach for compressing the image data $D_2$ of the second frame $F_2$. The different candidate compression modes may include a first candidate compression mode (e.g., a high quality mode) and a second candidate compression mode (e.g., a normal mode) which has an image output quality lower than that of the first candidate compression mode. As a simpler image will have greater spatial redundancy, the compression mode control signal $SQ_1$ will indicate that the first compression mode should be selected when the spatial redundancy of the first frame $F_1$ is found greater than a predetermined level. On the other hand, the compression mode control signal $SQ_1$ will indicate that the second compression mode is selected when the spatial redundancy of the first frame $F_1$ is not greater than the predetermined level.

Figure 3:
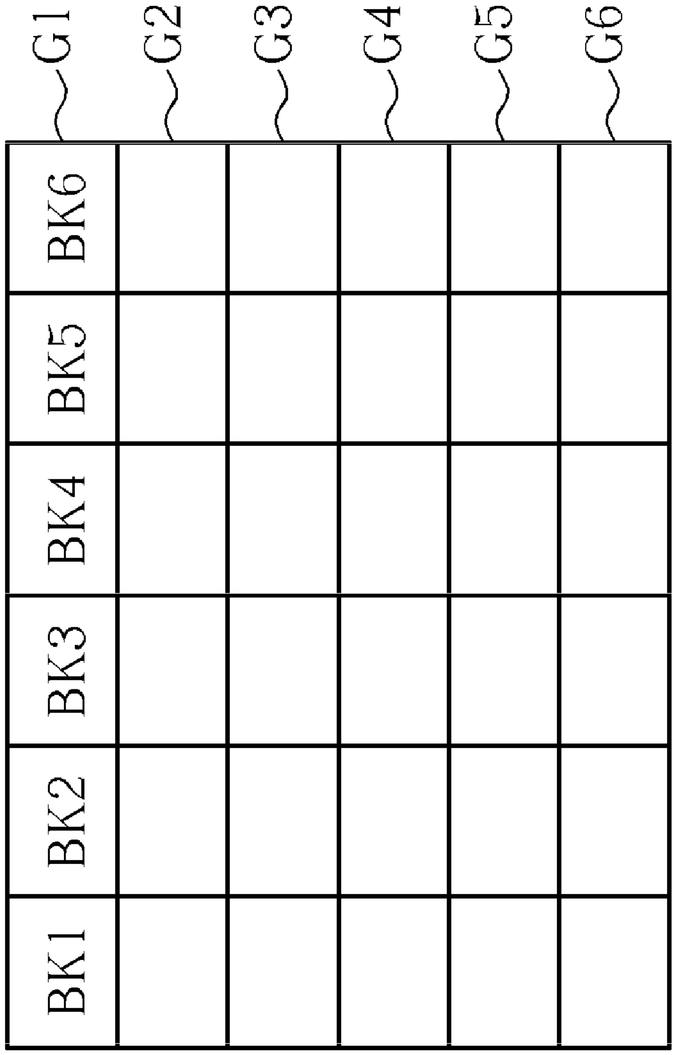
FIG. 3 is a diagram illustrating a frame having a plurality of blocks.

In an exemplary implementation, the compression mode control signal $SQ_1$ instructs the compression circuit 104 to utilize a target compression mode combination selected from a plurality of different candidate compression mode combinations each being a combination of a plurality of candidate compression modes under different compression approaches. Please refer to FIG. 3, which is a diagram illustrating a frame having a plurality of blocks to be processed by the compression circuit 104. As can be seen from FIG. 3, each frame to be compressed by the compression circuit 104 is divided into a plurality of horizontal line groups (e.g., six horizontal line groups G1-G6 in this example), where each horizontal line group has at least one horizontal line and divided into a plurality of blocks (e.g., six blocks BK1-BK6 in this example). The compression circuit 104 compresses each of the blocks in the same frame according to a compression mode selected from candidate compression modes included in the target compression mode combination that is indicated by the compression mode control signal generated from the image detection circuit 102. For example, the block BK1 may be compressed by one compression mode selected from candidate compression modes included in the target compression mode combination, and the next block BK2 may be compressed by another compression mode selected from candidate compression modes included in the same target compression mode combination.

Figure 4:
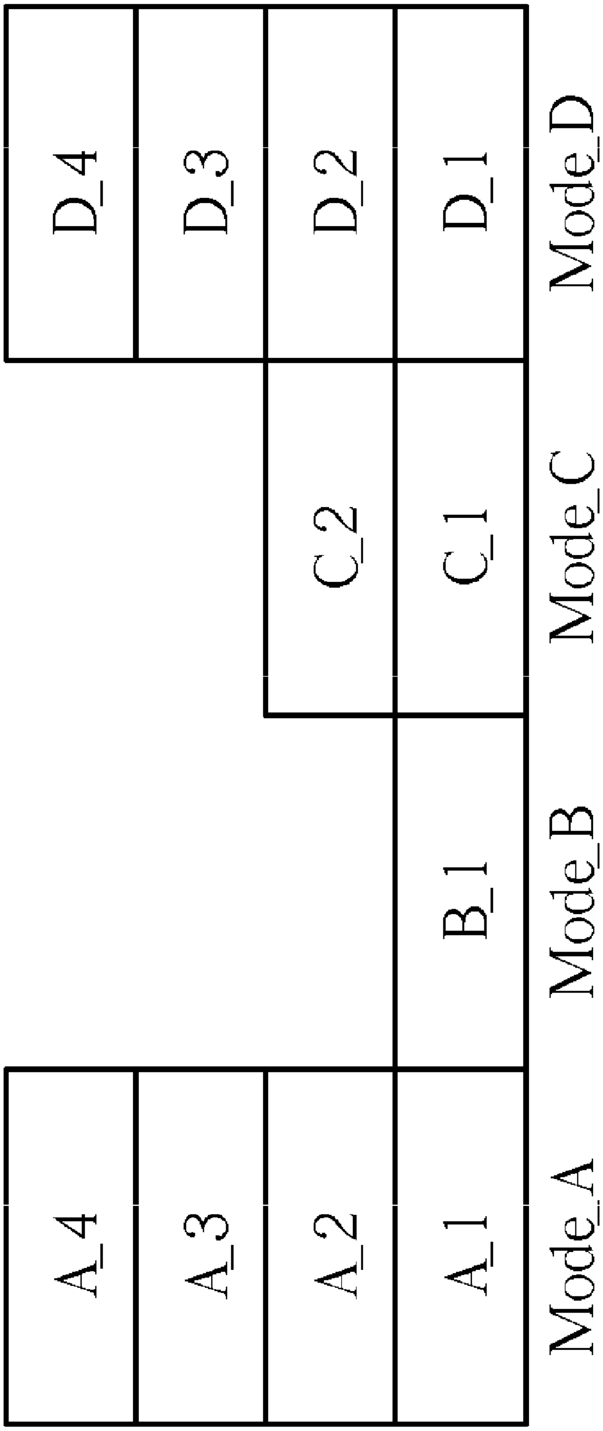
FIG. 4 is a diagram illustrating candidate compression modes available under different compression approaches.

FIG. 4 is a diagram illustrating candidate compression modes available under different compression approaches. As can be seen from FIG. 4, the first compression approach Mode_A has four candidate compression modes A_1, A_2, A_3 and A_4 respectively corresponding to different image output qualities, the second compression approach Mode_B has only one candidate compression mode B_1, the third compression approach Mode_C has two candidate compression modes C_1 and C_2 respectively corresponding to different image output qualities, and the fourth compression approach Mode_D has four candidate compression modes D_1, D_2, D_3, and D_4 respectively corresponding to different image output qualities. Therefore, each of the candidate compression mode combinations includes a compression mode selected from candidate compression modes $A_1$-A_4 for the first compression approach Mode_A, the candidate compression mode B_1 for the second compression approach Mode_B, a compression mode selected from candidate compression modes C_1-C_2 for the third compression approach Mode_C, and a compression mode selected from candidate compression modes $D_1$-D_4 for the fourth compression approach Mode_D. By way of example, but not limitation, one candidate compression mode combination may include candidate compression modes A_1, B_1, C_2 and D_3, and another candidate compression mode combination may include candidate compression modes A_3, B_1, C_1 and D_2.

In one exemplary design, candidate compression modes A_1-A_4 may have different settings of the number of bits used to store a DC value under the first compression approach Mode_A. If a simpler image is identified by the image detection circuit 102, one candidate compression mode which uses more bits to store the DC value may be selected and included in the target compression mode combination. If a more complex image is identified by the image detection circuit 102, one candidate compression mode which uses less bits to store the DC value may be selected and included in the target compression mode combination.

Therefore, based on the spatial redundancy of the first frame $F_1$, the image detection circuit 102 generates the desired compression mode control signal $SQ_1$ to indicate a target compression mode combination which is one of the candidate compression mode combinations. Next, the compression circuit 104 compresses each block of the second frame $F_2$ according to a compression mode selected from candidate compression modes of the target compression mode combination indicated by the compression mode control signal $SQ_1$, thereby using the bandwidth of the storage device 106 in an efficient way to achieve optimized image output quality.

Figure 5:
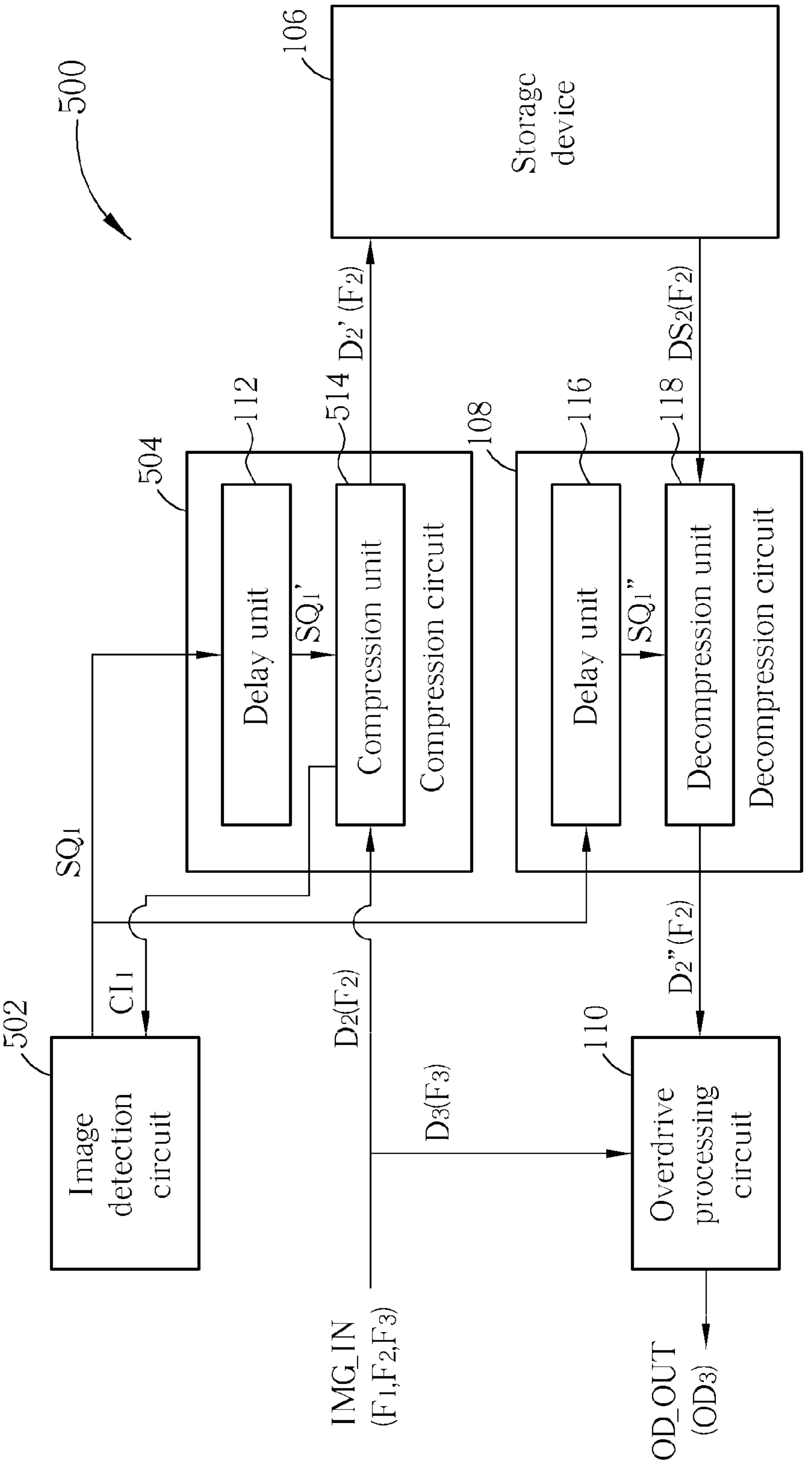
FIG. 5 is a block diagram illustrating a second exemplary embodiment of an image processing apparatus according to the present invention.

FIG. 5 is a block diagram illustrating a second exemplary embodiment of an image processing apparatus according to the present invention. The major difference between the image processing apparatus 500 shown in FIG. 5 and the image processing apparatus 100 shown in FIG. 1 is the implementation of the image detection 502 and the compression circuit 514, where the compression unit 514 in the compression circuit 504 is coupled to the image detection circuit 502, and outputs compression information of compressing an image data of each frame to the image detection circuit 502, and the image detection circuit 502 generates a compression mode control signal according to the received compression information. For example, the image detection circuit 502 receives compression information $CI_1$ of compressing the image data $D_1$ of the first frame $F_1$ from the compression circuit 504, and generates the compression mode control signal $SQ_1$, referenced for compressing the image data $D_2$ of the second frame $F_2$, according to at least the compression information $CI_1$.

In one exemplary implementation, the aforementioned compression information includes selected compression modes utilized by the compression circuit 504 for compressing a plurality of blocks within one frame. The compression mode selected from the target compression mode combination for compressing a block is relevant to the image content complexity (e.g., spatial redundancy) of the block. When the compression circuit 504 employed a selected compression mode to generate and output compression results of most of the blocks in one frame, where the selected compression mode corresponds to a greater compression ratio, this implies that the frame is a simpler image with lower image content complexity/higher spatial redundancy. Consider an example where the candidate compression mode A_1 shown in FIG. 4 is currently used when the first compression approach Mode_A is selected for compressing a block of the first frame $F_1$, and the candidate compression mode A_1 shown in FIG. 4 has an image output quality lower than that of the candidate compression mode A_2. When the compression information $CI_1$ indicates that a total number of candidate compression modes A_1 included in the selected compression modes used for compressing blocks of the first frame $F_1$ is greater than a predetermined value, the compression mode control signal $SQ_1$ generated from the image detection circuit 502 may indicate that the compression mode A_2 should be used instead when the first compression approach Mode_A is selected for compressing a block of the second frame $F_2$ following the first frame $F_1$. However, when the compression information $CI_1$ indicates that the total number of candidate compression modes A_1 included in the selected compression modes used for compressing blocks of the first frame $F_1$ is not greater than the predetermined value, the compression mode control signal $SQ_1$ generated from the image detection circuit 502 may indicate that the compression mode A_1 should be still used or another compression mode with poorer image output quality should be used when the first compression approach Mode_A is selected for compressing a block of the second frame $F_2$ following the first frame $F_1$.

In another exemplary implementation, the aforementioned compression information $CI_1$ provided by the compression circuit 504 may include a data size of a compressed image data of a frame. Similarly, the data size of the compressed image data of the frame is relevant to the image content complexity (e.g., spatial redundancy) of the frame. When the compression circuit 504 employs a target compression mode combination to generate and output the compressed image data of the frame, where the target compression mode combination corresponds to a higher compression ratio, this implies that the frame is a simpler image with lower image content complexity/higher spatial redundancy. Consider an example where the candidate compression mode A_1 shown in FIG. 4 is currently used when the first compression approach Mode_A is selected for compressing a block of the first frame $F_1$, and the candidate compression mode A_1 shown in FIG. 4 has an image output quality lower than that of the candidate compression mode A_2. When the compression information $CI_1$ indicates that a ratio of a data size of the image data of the first frame $F_1$ to the data size of the compressed image data of the first frame $F_1$ is greater than a predetermined value, the compression mode control signal $SQ_1$ generated from the image detection circuit 502 may indicate that the compression mode A_2 should be used instead when the first compression approach Mode_A is selected for compressing a block of the second frame $F_2$ following the first frame $F_1$. However, when the compression information $CI_1$ indicates that the ratio of the data size of the image data of the first frame $F_1$ to the data size of the compressed image data of the first frame $F_1$ is not greater than the predetermined value, the compression mode control signal $SQ_1$ generated from the image detection circuit 502 may indicate that the compression mode A_1 should be still used or another compression mode with poorer image output quality should be used when the first compression approach Mode_A is selected for compressing a block of the second frame $F_2$ following the first frame $F_1$.

Figure 6:
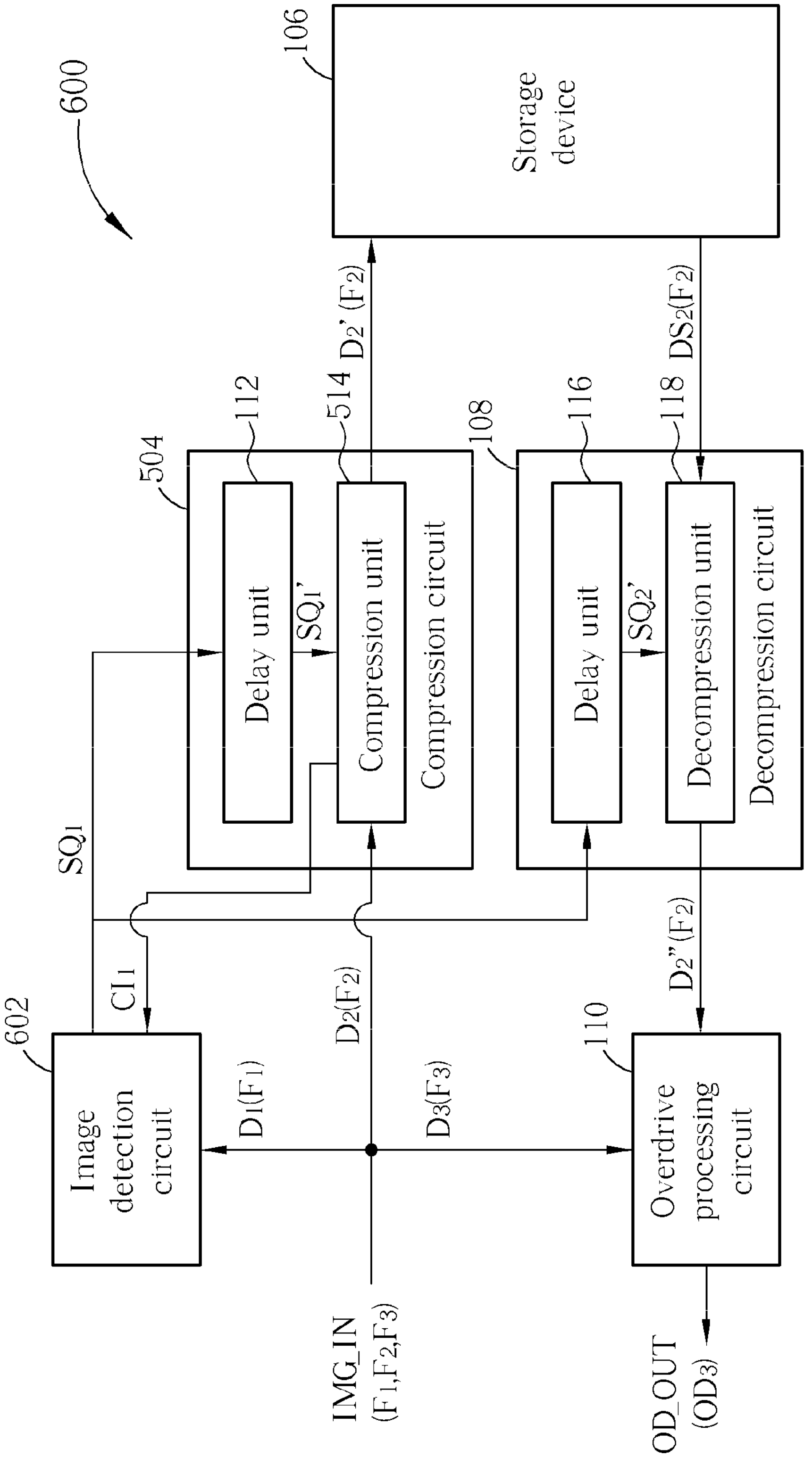
FIG. 6 is a block diagram illustrating a third exemplary embodiment of an image processing apparatus according to the present invention.

In one exemplary embodiment shown in FIG. 1, the image detection circuit 102 is configured to analyze an image data of a frame and refer to the obtained frame property to generate a compression mode control signal used for controlling a compression operation applied to an image data of a next frame. In another exemplary embodiment shown in FIG. 5, the image detection circuit 502 is configured to receive compression information of compressing an image data of a frame and refer to at least the compression information to generate a compression mode control signal used for controlling a compression operation applied to an image data of a next frame. However, in yet another exemplary embodiment, an image detection circuit may refer to both of the frame property and the compression information of one frame to generate a compression mode control signal for a next frame. Please refer to FIG. 6, which is a block diagram illustrating a third exemplary embodiment of an image processing apparatus according to the present invention. The major difference between the image processing apparatus 600 shown in FIG. 6 and the image processing apparatus 500 shown in FIG. 5 is that the image detection circuit 602 generates a compression mode control signal (e.g., $SQ_1$) used for controlling the compression operation applied to a frame by checking the frame property (e.g., spatial redundancy) of a previous frame (e.g., $F_1$) as well as the compression information (e.g., $CI_1$) derived from compressing an image data of the previous frame. The same objective of using the bandwidth of the storage device 106 in an efficient way to achieve optimized image output quality is achieved.

Figure 7:
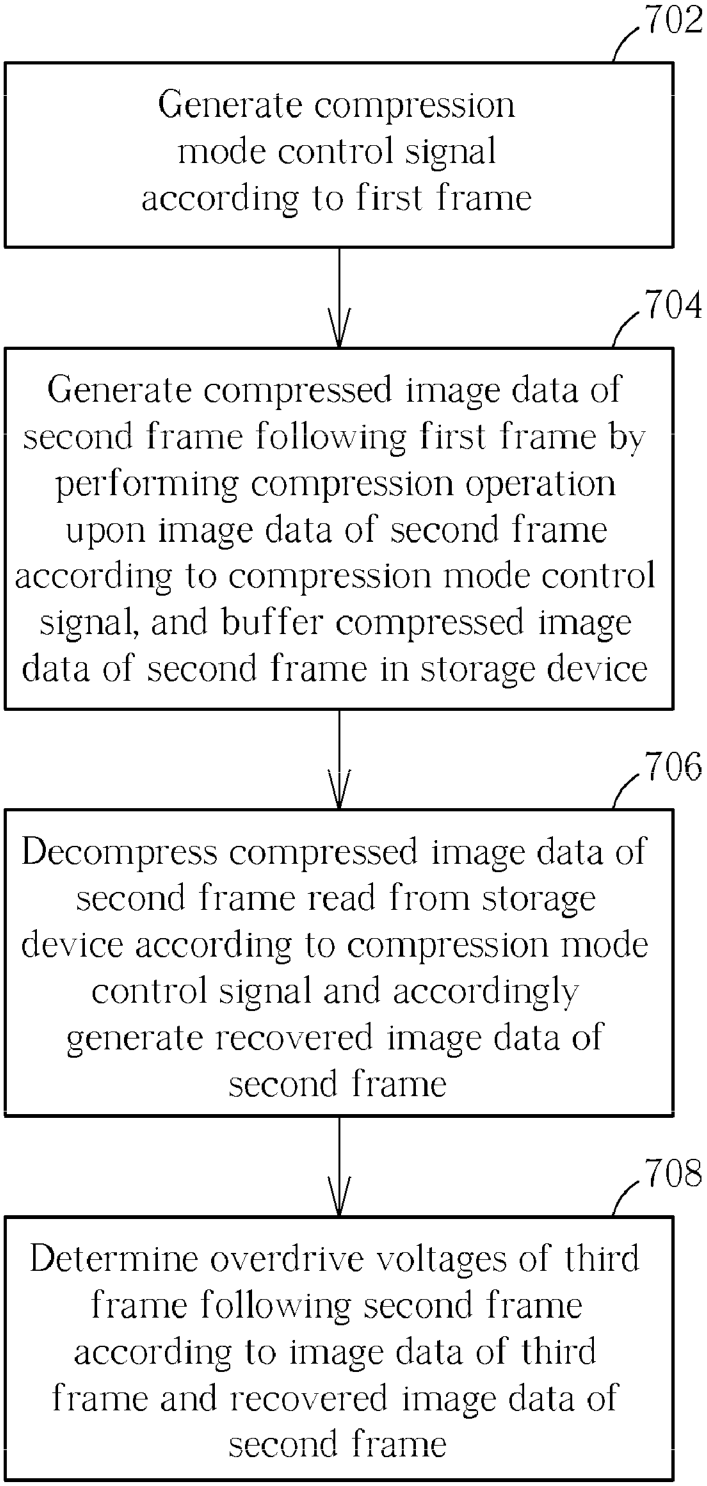
FIG. 7 is a flowchart illustrating a generalized image data processing method according to an exemplary embodiment of the present invention.

FIG. 7 is a flowchart illustrating a generalized image data processing method according to an exemplary embodiment of the present invention. The generalized image data processing method may be employed by any of the image data processing apparatuses 100, 500, and 600 mentioned above. Provided that the result is substantially the same, the steps are not required to be executed in the exact order shown in FIG. 7. The exemplary generalized image data processing method includes following steps:

Step 702: Generate a compression mode control signal according to a first frame (e.g., a previous frame).

Step 704: Generate a compressed image data of a second frame (e.g., a current frame) by performing a compression operation upon an image data of the second frame according to the compression mode control signal, and buffer the compressed image data of the second frame in a storage device (e.g., a frame buffer), where the first frame precedes the second frame.

Step 706: Read the compressed image data of the second frame from the storage device, and decompress the compressed image data of the second frame according to the compression mode control signal to thereby generate a recovered image data of the second frame.

Step 708: Determine overdrive voltages of a third frame (e.g., a next frame) according to an image data of the third frame and the recovered image data of the second frame, wherein the second frame precedes the third frame.

As a person skilled in the art can readily understand details of the steps shown in FIG. 7 after reading above paragraphs directed to image processing apparatuses 100, 500 and 600, further description is omitted here for brevity.

Those skilled in the art will readily observe that numerous modifications and alterations of the device and method may be made while retaining the teachings of the invention.

What is claimed is:

1. An image processing apparatus, comprising:

a storage device;

an image detection circuit, for generating a compression mode control signal according to a first frame;

a compression circuit, coupled to the storage device and the image detection circuit, for compressing an image data of a second frame according to the compression mode control signal and accordingly generating a compressed image data of the second frame to the storage device, wherein the first frame precedes the second frame;

a decompression circuit, coupled to the storage device and the image detection circuit, for reading the compressed image data of the second frame from the storage device, and decompressing the compressed image data of the second frame according to the compression mode control signal and accordingly generating a recovered image data of the second frame; and an overdrive processing circuit, coupled to the decompression circuit, for determining overdrive voltages of a third frame according to an image data of the third frame and the recovered image data of the second frame, wherein the second frame precedes the third frame.

2. The image processing apparatus of claim 1, wherein the image detection circuit analyzes an image data of the first frame to generate the compression mode control signal.

3. The image processing apparatus of claim 2, wherein the image detection circuit determines the compression mode control signal according to spatial redundancy of the first frame.

4. The image processing apparatus of claim 3, wherein the compression mode control signal instructs the compression circuit to refer to a compression mode selected from a plurality of different candidate compression modes for compressing the image data of the second frame.

5. The image processing apparatus of claim 4, wherein the different candidate compression modes include a first candidate compression mode and a second candidate compression mode which has an image output quality lower than that of the first candidate compression mode; the compression mode control signal indicates that the first candidate compression mode is selected when the spatial redundancy of the first frame is greater than a predetermined level, and indicates that the second candidate compression mode is selected when the spatial redundancy of the first frame is not greater than the predetermined level.

6. The image processing apparatus of claim 1, wherein the compression circuit is coupled to the image detection circuit and further compresses an image data of the first frame; and the image detection circuit receives compression information of compressing the image data of the first frame from the compression circuit and generates the compression mode control signal according to at least the compression information.

7. The image processing apparatus of claim 6, wherein the first frame is divided into a plurality of horizontal line groups; each horizontal line group has at least one horizontal line and divided into a plurality of blocks; the compression circuit compresses each block according to a selected compression mode; and the compression information includes selected compression modes utilized by the compression circuit for compressing a plurality of blocks within the first frame.

8. The image processing apparatus of claim 7, wherein the compression mode control signal instructs the compression circuit to refer to a compression mode selected from a plurality of different candidate compression modes for compressing the image data of the second frame.

9. The image processing apparatus of claim 8, wherein the different candidate compression modes include a first candidate compression mode and a second candidate compression mode which has an image output quality lower than that of the first candidate compression mode; the compression mode control signal indicates that the first candidate compression mode is selected when a total number of second candidate compression modes included in the selected compression modes is greater than a predetermined value.

10. The image processing apparatus of claim 6, wherein the compression information includes a data size of a compressed image data of the first frame.

11. The image processing apparatus of claim 10, wherein the compression mode control signal instructs the compression circuit to refer to a compression mode selected from a plurality of different candidate compression modes for compressing the image data of the second frame.

12. The image processing apparatus of claim 11, wherein the different candidate compression modes include a first candidate compression mode and a second candidate compression mode which has an image output quality lower than that of the first candidate compression mode; the compression mode control signal indicates that the first candidate compression mode is selected when a ratio of a data size of the image data of the first frame to the data size of the compressed image data is greater than a predetermined value, and indicates that the second candidate compression mode is selected when the ratio is not greater than the predetermined value.

13. The image processing apparatus of claim 1, wherein the compression mode control signal instructs the compression circuit to utilize a target compression mode combination selected from a plurality of different candidate compression mode combinations each being a combination of a plurality of candidate compression modes.

14. The image processing apparatus of claim 13, wherein the second frame is divided into a plurality of horizontal line groups, each horizontal line group has at least one horizontal line and divided into a plurality of blocks, and the compression circuit compresses each block according to a compression mode selected from compression modes included in the target compression mode combination indicated by the compression mode control signal.

15. An image processing method, comprising:

generating and outputting a compression mode control signal according to a first frame;

generating a compressed image data of a second frame by performing a compression operation upon an image data of the second frame according to the compression mode control signal, and buffering the compressed image data of the second frame, wherein the first frame precedes the second frame;

reading the buffered compressed image data of the second frame, and decompressing the buffered compressed image data of the second frame according to the compression mode control signal and accordingly generating a recovered image data of the second frame; and utilizing an overdrive processing circuit for determining overdrive voltages of a third frame according to an image data of the third frame and the recovered image data of the second frame, wherein the second frame precedes the third frame.

16. The image processing method of claim 15, wherein generating the compression mode control signal according to the first frame comprises:

analyzing an image data of the first frame to generate the compression mode control signal.

17. The image processing method of claim 16, wherein analyzing the image data of the first frame to generate the compression mode control signal comprises:

determining the compression mode control signal according to spatial redundancy of the first frame.

18. The image processing method of claim 15, wherein the compression mode control signal instructs the compression operation to refer to a compression mode selected from a plurality of different candidate compression modes for compressing the image data of the second frame.

19. The image processing method of claim 15, further comprising:

performing the compression operation upon an image data of the first frame;

wherein generating the compression mode control signal according to the first frame comprises:

receiving compression information of compressing the image data of the first frame; and generating the compression mode control signal according to at least the compression information.

20. The image processing method of claim 19, wherein the first frame is divided into a plurality of horizontal line groups; each horizontal line group has at least one horizontal line and divided into a plurality of blocks; the compression operation compresses each block according to a selected compression mode; and the compression information includes selected compression modes utilized by the compression operation for compressing a plurality of blocks within the first frame.

21. The image processing method of claim 19, wherein the compression information includes a data size of a compressed image data of the first frame.

22. The image processing method of claim 15, wherein the compression mode control signal instructs the compression operation to utilize a target compression mode combination selected from a plurality of different candidate compression mode combinations each being a combination of a plurality of candidate compression modes.

23. The image processing method of claim 22, wherein the second frame is divided into a plurality of horizontal line groups, each horizontal line group has at least one horizontal line and divided into a plurality of blocks, and the compression operation compresses each block according to a compression mode selected from compression modes included in the target compression mode combination indicated by the compression mode control signal.

* * * * *